(12) United States Patent
Newell

(10) Patent No.: US 10,250,837 B2
(45) Date of Patent: Apr. 2, 2019

(54) USER PROXIMITY RECOGNITION AND HANDS-FREE CONTROL

(71) Applicant: DISH Technologies L.L.C., Englewood, CO (US)

(72) Inventor: Nicholas B. Newell, Highlands Ranch, CO (US)

(73) Assignee: DISH Technologies L.L.C., Englewood, CO (US)

( * ) Notice: Subject to any disclaimer, the term of this patent is extended or adjusted under 35 U.S.C. 154(b) by 298 days.

(21) Appl. No.: 13/706,043

(22) Filed: Dec. 5, 2012

(65) Prior Publication Data

US 2014/0152899 A1   Jun. 5, 2014

(51) Int. Cl.
| | |
|---|---|
| *H04N 5/44* | (2011.01) |
| *H04N 21/41* | (2011.01) |
| *H04N 21/422* | (2011.01) |
| *H04N 21/436* | (2011.01) |
| *H04N 21/4363* | (2011.01) |
| *H04N 21/442* | (2011.01) |
| *H04N 21/45* | (2011.01) |
| *H04N 21/475* | (2011.01) |
| *H04N 21/4415* | (2011.01) |

(52) U.S. Cl.
CPC .......... *H04N 5/44* (2013.01); *H04N 21/4126* (2013.01); *H04N 21/42203* (2013.01); *H04N 21/43615* (2013.01); *H04N 21/43637* (2013.01); *H04N 21/4415* (2013.01); *H04N 21/44227* (2013.01); *H04N 21/4532* (2013.01); *H04N 21/4751* (2013.01); *H04N 21/4222* (2013.01); *H04N 21/42207* (2013.01); *H04N 21/42208* (2013.01); *H04N 21/42222* (2013.01); *H04N 21/42224* (2013.01)

(58) Field of Classification Search
None
See application file for complete search history.

(56) References Cited

U.S. PATENT DOCUMENTS

| | | | |
|---|---|---|---|
| 7,982,615 | B2 | 7/2011 | Kennedy |
| 8,152,642 | B2 | 4/2012 | Ergen et al. |
| 8,942,995 | B1* | 1/2015 | Kerr ...................... H04W 4/021 463/25 |
| 2003/0093784 | A1 | 5/2003 | Dimitrova et al. |
| 2004/0049786 | A1* | 3/2004 | Bauminger et al. ............ 725/46 |
| 2004/0104806 | A1* | 6/2004 | Yui ........................ G08C 17/02 340/5.74 |
| 2004/0147265 | A1 | 7/2004 | Kelley et al. |
| 2007/0107008 | A1 | 5/2007 | Dybus |
| 2008/0146151 | A1* | 6/2008 | Lyu et al. .................... 455/41.2 |
| 2009/0125948 | A1 | 5/2009 | Kuhlke et al. |
| 2009/0233593 | A1 | 9/2009 | Ergen et al. |
| 2009/0233715 | A1 | 9/2009 | Ergen et al. |

(Continued)

FOREIGN PATENT DOCUMENTS

| | | |
|---|---|---|
| EP | 1 158 821 A1 | 11/2001 |
| EP | 1 534 023 A1 | 5/2005 |

(Continued)

*Primary Examiner* — Samira Monshi
(74) *Attorney, Agent, or Firm* — Seed IP Law Group LLP

(57) ABSTRACT

A set-top box provides for touch free operation of home entertainment system. The set-top box detects the mobile phone of a of a user and initiates a configuration of the home entertainment system according to the preferences of the user.

16 Claims, 7 Drawing Sheets

(56) References Cited

U.S. PATENT DOCUMENTS

| | | | |
|---|---|---|---|
| 2009/0298514 A1* | 12/2009 | Ullah | 455/456.5 |
| 2010/0070995 A1 | 3/2010 | Pan | |
| 2010/0103316 A1 | 4/2010 | Colsey et al. | |
| 2010/0107185 A1* | 4/2010 | Shintani | H04N 21/4126 725/25 |
| 2010/0144283 A1 | 6/2010 | Curcio et al. | |
| 2010/0317332 A1 | 12/2010 | Bathiche et al. | |
| 2010/0333163 A1* | 12/2010 | Daly | 725/133 |
| 2011/0035766 A1 | 2/2011 | Reynolds | |
| 2011/0136442 A1* | 6/2011 | Beals | 455/73 |
| 2012/0190301 A1* | 7/2012 | Hart | H04M 1/7253 455/41.2 |
| 2013/0114380 A1* | 5/2013 | Bryger et al. | 367/199 |
| 2014/0137197 A1* | 5/2014 | Lazaridis et al. | 726/3 |
| 2014/0154975 A1* | 6/2014 | Lambert et al. | 455/41.1 |
| 2016/0295153 A1* | 10/2016 | Barnett | H04N 5/4403 |

FOREIGN PATENT DOCUMENTS

| | | |
|---|---|---|
| WO | 2004039103 A1 | 5/2004 |
| WO | 2008/034072 A2 | 3/2008 |

\* cited by examiner

USER PROXIMITY RECOGNITION AND HANDS-FREE CONTROL

BACKGROUND

Technical Field

The present application relates to the field of set-top boxes configured to provide media content for a home entertainment system.

Description of the Related Art

Set-top boxes are used to provide media content in many homes entertainment systems. Set-top boxes typically provide media content to be displayed on a television or other display screen. Home entertainment systems often include DVD players, surround sound systems, video game consoles and other media devices.

When a user wishes to view media content he must typically pick up one of several remote controls and turn on the device and select the content that he wishes to view. It can be a cumbersome and time consuming process to turn on all of the desired media devices and using one or more remote controls to operate them.

BRIEF SUMMARY

One embodiment is a set-top box configured to store in memory a plurality of user identification codes associated with respective portable electronic devices each carried by a respective individual user of home entertainment system. The portable electronic devices are for example the mobile phones used by each member of the household. The set-top box is configured to repeatedly transmit an interrogation signal to detect the presence of any of the portable electronic devices. When one of the portable electronic devices is in range of the interrogation signal, the portable electronic device transmits an identification signal with an identification code. When the set top box receives the identification code, the set top box is configured to compare the identification code with the user identification codes stored in memory and to retrieve a user profile associated with the matching user code. The set top box is configured to execute an initial command stored in the user profile. The initial command can include displaying selected media content on a display coupled to the set-top box. Alternatively the initial command can include emitting an audible request for instructions, the set-top box being configured to recognize audible commands from the user and to execute them.

Therefore a user of a home entertainment system can merely walk in the room in which a set-top box is located while carrying his mobile phone and the set-top box will detect the presence of the mobile phone and begin operations unique to the preferences of the user. The user need not operate a remote control to initiate operation of the set-top box.

DETAILED DESCRIPTION

Figure 1:
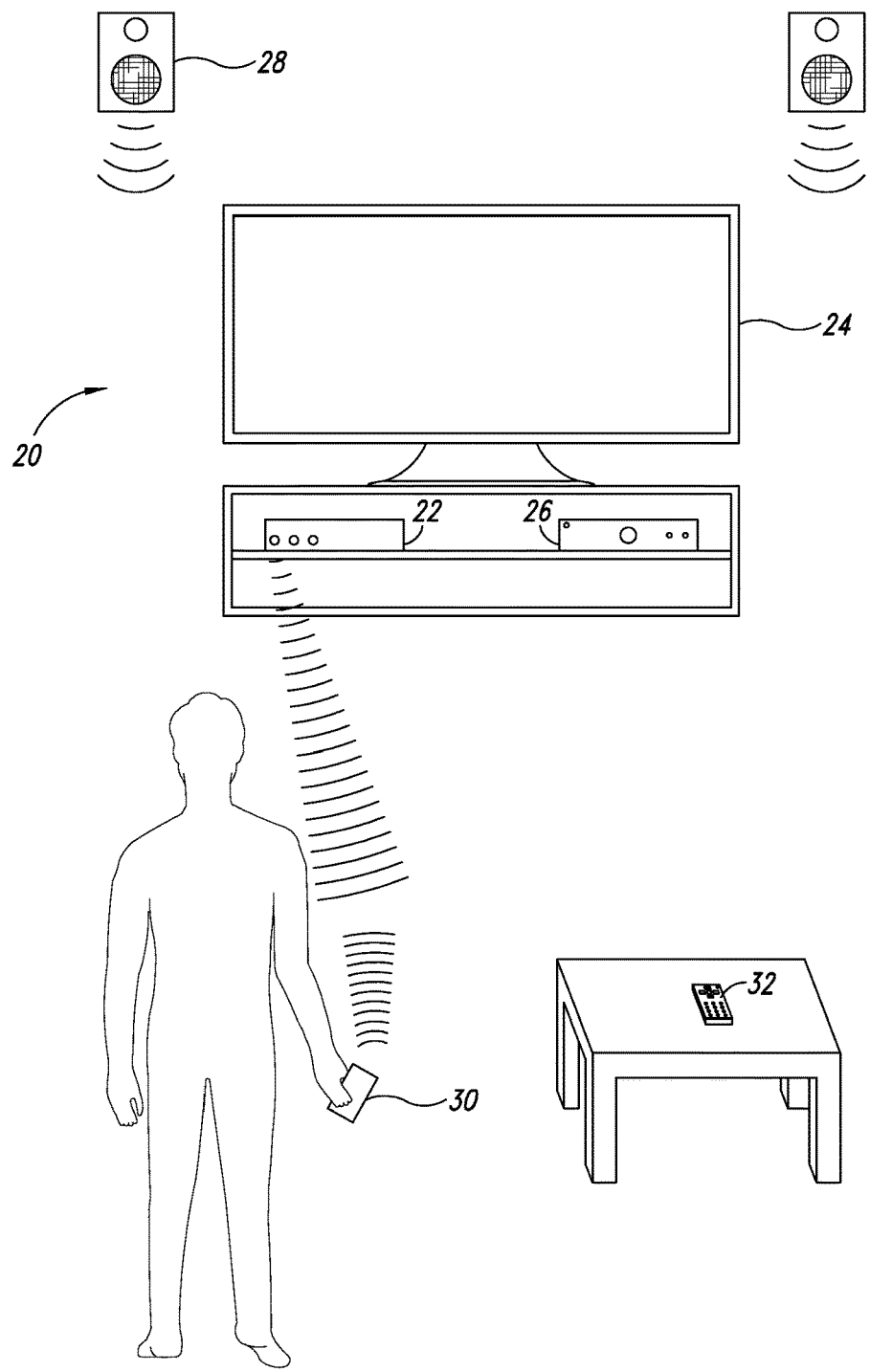
FIG. 1 illustrates a media content providing system according to one embodiment.

FIG. 1 illustrates a home entertainment system 20 according to one embodiment. The home entertainment system 20 includes a set-top box 22 coupled to a television 24. The set-top box 22 and the television 24 are further coupled to an electronic media device 26 and an audio system 28. A remote control 32 is capable of controlling one or more of the set-top box 22, television 24, the electronic media device 26, and the audio system 28. A portable electronic device 30 is illustrated as being the hand of a user of the home entertainment system 20. The portable electronic device 30 communicates wirelessly with the set-top box 22.

The set-top box 22 receives media content from a media content provider such as a satellite or cable television provider. The set-top box 22 is coupled to the television 24 and configured to display media content on the television 24. The media content can include such things as television programs, recorded video or audio programs, satellite radio, or other media content.

The electronic media device 26 is, for example, a DVD player, a DVR, a video game console, or another kind of electronic media device. The electronic media device 26 can also provide media content to the television 24 to be displayed thereon. Audio system 28 includes speakers which provide audio content for a user of the home entertainment system 20.

The audio content corresponds to the audio portion of a television program, a movie, a game, or a satellite radio program provided by the set-top box 22, or the electronic media device 26. A remote control 32 can send control signals to one or more of the set-top box 22, the television 24, the electronic media device 26, or the audio system 28.

In one embodiment, the set-top box 22 is configured to interface with the portable electronic device 30 of the user. In a typical home there may be many people who will operate the entertainment system 20. Each person in the home may have their own preferences regarding what media content to display or which audio content to listen to. In a typical home entertainment system 20, any user that wishes to operate the home entertainment system 20 will use the remote control 32 to operate one or more of the set-top box 22, the electronic media device 26, the television 24, or the audio system 28. However, the set-top box 22 of FIG. 1 is configured to be paired with and recognize the portable electronic device 30.

Because each member of the household may have a separate and personal portable electronic device 30, such as a mobile phone, a PDA, an MP3 player, or other kinds of portable electronic devices, the set-top box 22 can be configured to recognize each portable electronic device of the various household members. Thus, when a user of the home entertainment system 20 comes into proximity with the set-top box 22, the set-top box 22 will detect the presence of and recognize the portable electronic device 30 that is, for instance, being carried in the pocket of the user. Upon detection of the portable electronic device 30, and without any prompt from the user, the set-top box 22 will configure the home entertainment system 20 to the particular preferences of that user as identified by the portable electronic device 30.

In one embodiment the set-top box 22 can detect the portable electronic device 30 anywhere within the home, and can calculate how close the portable electronic device 30 is to the set-top box 22. However, it may be desirable that the set-top box only perform an action when the user is within the same room as the set-top box 22. In one embodiment the set-top box 22 will only perform an action when the portable electronic device 30 is within a selected distance of the set-top box 22. The selected distance can be can be programmed by the user of the set-top box 22. This allows the user to adjust the selected distance according to the particular arrangements and dimensions of the room or residence in which the set-top box is situated.

In one embodiment, the set-top box 22 can be configured to automatically perform an action only when the portable electronic device 30 is detected to be within the room in which the set-top box 22 is situated. Hereafter, when the set-top box 22 is described as performing an action after detecting the presence of a portable electronic device 30 or when the electronic device 30 is in proximity to the set-top box 22, these situations can include the situation in which the set-top box 22 has detected that the portable electronic device 30 is within the selected distance as described above.

The set-top box 22 can be further configured to automatically perform an action only when the portable electronic device 30 has been stationary within the room and the user is thereby deemed to be sitting down. For example, the set-top box 22 can be programmed to automatically perform an action when the set-top box 22 has detected that the electronic device has been stationary for three seconds. This can distinguish between a situation in which the user is merely passing through the room and a situation in which the user desires to operate the set-top box 22.

The set-top box 22 can be further configured to automatically perform an action a limited number of times within a given time frame. For instance, it is possible that a user of the portable electronic device 30 will enter and remain in the room in which the set-top box 22 is situated for a purpose other than operating the set-top box 22. To limit the disturbance that the set-top box 22 can cause the user by repeatedly performing automatic actions, the set-top box 22 can be configured to perform an action only once or twice per hour. Thus if a user remains in the room with the set-top box 22 or repeatedly goes in and out of the room, the set-top box will not bother the user by repeatedly performing an automatic action. The user can configure the set-top box 22 to set the desired number of operations that the set-top box 22 will automatically perform in a given period of time.

Initial pairing of the set-top box 22 with a previously unpaired portable electronic device 30 of a user can be done in many ways. In one example, when the user wants to register his portable electronic device 30 with the set-top box 22, the user will operate the remote control 32 to send a command to the set-top box 22 to accept a signal from the portable electronic device 30. Signals are passed between the portable electronic device 30 and the set-top box 22 by which an identification code of the portable electronic device 30 is provided to the set-top box 22. The set-top box 22 stores the identification code in a memory of the set-top box 22. The user can then enter his personal preferences and provide a name to be associated with the portable electronic device 30. The user preferences can be entered using the remote control 32, by pressing keys located on the set-top box 22, or by using the portable electronic device 30 to transmit preference data to the set-top box 22.

After the portable electronic device 30 has been initially registered with the set-top box 22, the set-top box 22 can be configured to perform an initial operation or set of operations any time the presence of the portable electronic device 30 is detected. In one embodiment, upon detecting the presence of the portable electronic device 30, the set-top box 22 issues an audio request for instructions from the user. The set-top box 22 may call out the user by name, and ask if the user would like the set-top box to turn on the television and display media content. The media content can be chosen according to the preferences stored in memory at the time of registration of the portable electronic device 30 or according to learned preferences that the set-top box 22 records as the user operates the home entertainment system 20.

Accordingly, the set-top box 22 is equipped with a microphone and speech recognition capabilities. The user can respond to the audio request of the set-top box 22 by saying "yes" or "no," or by providing more specific instructions to the set-top box 22. Such more specific instructions can include instructions to display a certain television program on the television 24 from the set-top box 22.

The set-top box 22 can also be configured to accept audio commands to operate the electronic media device 26, the audio system 28, and the television 24. Accordingly, the set-top box 22 is configured to control the television 24, the electronic media device 26, and the audio system 28. The set-top box 22 can include transceivers configured to send control signals directly to the television 24, the electronic media device 26, or the audio system 28. Alternatively, the set-top box 22 can be configured to send control signals to the remote control 32, which then sends control signals to the television 24, the electronic media device 26, or the audio system 28. In this alternative embodiment, the remote control 32 has a receiver to receive signals from the set top box and a transmitter to transmit signals out to other components in the entertainment system, such as to the television 24, media device 26 or audio system 28. In this way, the set top box need only communicate with the portable device 30 and the remote 32, and the remote 32 can be a universal remote that communicates with all audiovisual devices in the system, of many different brands.

In one embodiment, the set-top box 22 is configured to turn on the television 24 and display a particular media content channel upon detecting the presence of the portable electronic device 30 without any audio prompts. Alternatively, the set-top box 22 can be configured to tune into the most recently viewed channel. The set-top box 22 can also be configured to automatically begin playing a program from a DVR which was previously paused or turned off. If the user leaves the room, and thus the portable electronic device 30 is no longer in proximity to the set-top box 22, the set-top box 22 can be configured to power down and then resume function upon detection of the portable electronic device 30 at a subsequent time.

The set-top box 22 can also cause the electronic media device 26 to activate and provide preferred media content upon detecting the presence of the portable electronic device 30. In this way, the home entertainment system 20 can provide preferred media content to a user without the need for the user to operate the remote control 32 or to manually press input buttons on the set-top box 22, the television 24, the electronic media device 26, or the audio system 28. The home entertainment system 20 according to one embodiment can thus be totally hands free, as the home entertainment system can be activated by the mere presence of the user, and can be controlled by the user's voice.

The set-top box 22 can store user information for a plurality of portable electronic devices 30, each associated with a different user of the home entertainment system 20. Each user has a profile stored in memory and associated with a respective portable electronic device 30. When the set-top box 22 detects the portable electronic device 30 of one of the users, that user's profile is called up and the set-top box 22 performs operations according to the unique user profile. These operations can include requesting audio instructions from the user, automatically turning on to a particular program, or any other suitable operation personalized to the particular user.

In one embodiment, each user is assigned a certain priority. For example, a parent may have a priority that is higher than a priority of one of the children or other people in the home. If the set-top box detects the presence of two portable electronic devices 30 of different users, the set-top box 22 can compare the priority data of each user profile and then execute operations based on the user that has the highest priority. In one example, if a lower priority user is using the home entertainment system 20, and the portable electronic device of a higher priority user is detected by the set-top box 22, the set-top box 22 can ask if control should be given to the higher priority user. Alternatively, the set-top box 22 can automatically give control to the higher priority user, and can load the configuration according to that user's profile. On the other hand, if a high priority user has started the program and was the first to start this session, and then a lower priority user enters the room, the system can ignore the presence of the lower priority person. From a practical view, this might occur if the father is watching a football game and has been for a few hours and a son walks into the room. The system would not interrupt the show to ask the son if he wishes to change channels.

In one embodiment, the set-top box 22 is configured to recognize the voice of each of the users. The set-top box 22 can be configured to accept spoken commands only from the highest priority user whose presence is currently detected. The set-top box 22 can also be configured, upon command by the highest priority user, to accept commands from a lower priority user even while the higher priority user is still present.

In one embodiment, the portable electronic device 30 and the set-top box 22 are paired by Bluetooth communication protocol or by other suitable wireless communication protocol. The set-top box 22 can be configured to periodically transmit an interrogation signal. When a portable electronic device 30 that has been paired with the set-top box 22 receives the interrogation signal, the portable electronic device 30 can transmit an identification signal. The identification signal includes a unique identification code for the portable electronic device 30. The unique identification code can include a MAC address of the portable electronic device 30, a selected identification code stored in the memory of the portable electronic device 30, or any other suitable identification code which can serve to uniquely identify the portable electronic device 30.

Therefore, upon initial pairing of the portable electronic device 30 with the set-top box 22, the set-top box 22 stores in memory the unique identification code corresponding to the portable electronic device 30. A user profile is then created and stored in the memory of the set-top box 22. The user profile includes the unique identification code and user preferences. The user preferences can be specifically entered by the user, and changed at subsequent times, or the set-top box 22 can learn the user preferences by noting patterns in the user's use of the set-top box 22 as described previously. The set-top box 22 can store the user profiles for many users. Thus, when any of the users enters the room where the set-top box 22 is located and has the associated portable electronic device 30, the set-top box 22 can enter into an operation mode according to the corresponding user profile stored in memory.

In one embodiment, the set-top box 22 learns what media content the user prefers at various times of the day and at various days of the week or even times of the month. Thus, if a user enters the room where the set-top box 22 is located at 7:00 p.m. on Monday night, the set-top box 22, by recording previous usage data, can immediately turn on the program or other content that the user typically watches on Monday night at 7:00 p.m. The set-top box 22 can also be configured to prevent certain content from being displayed when certain users are present. For example, if a parent does not want a younger user to be able to access adult media content, the specific user profile of that user can be programmed so that the set-top box 22 will not display adult content in the presence of that user or at the request of that user. Many other control schemes and profile preferences can be set up in accordance with principles of the present disclosure, as will be apparent to those of skill in the art in light of the present disclosure.

Figure 2:
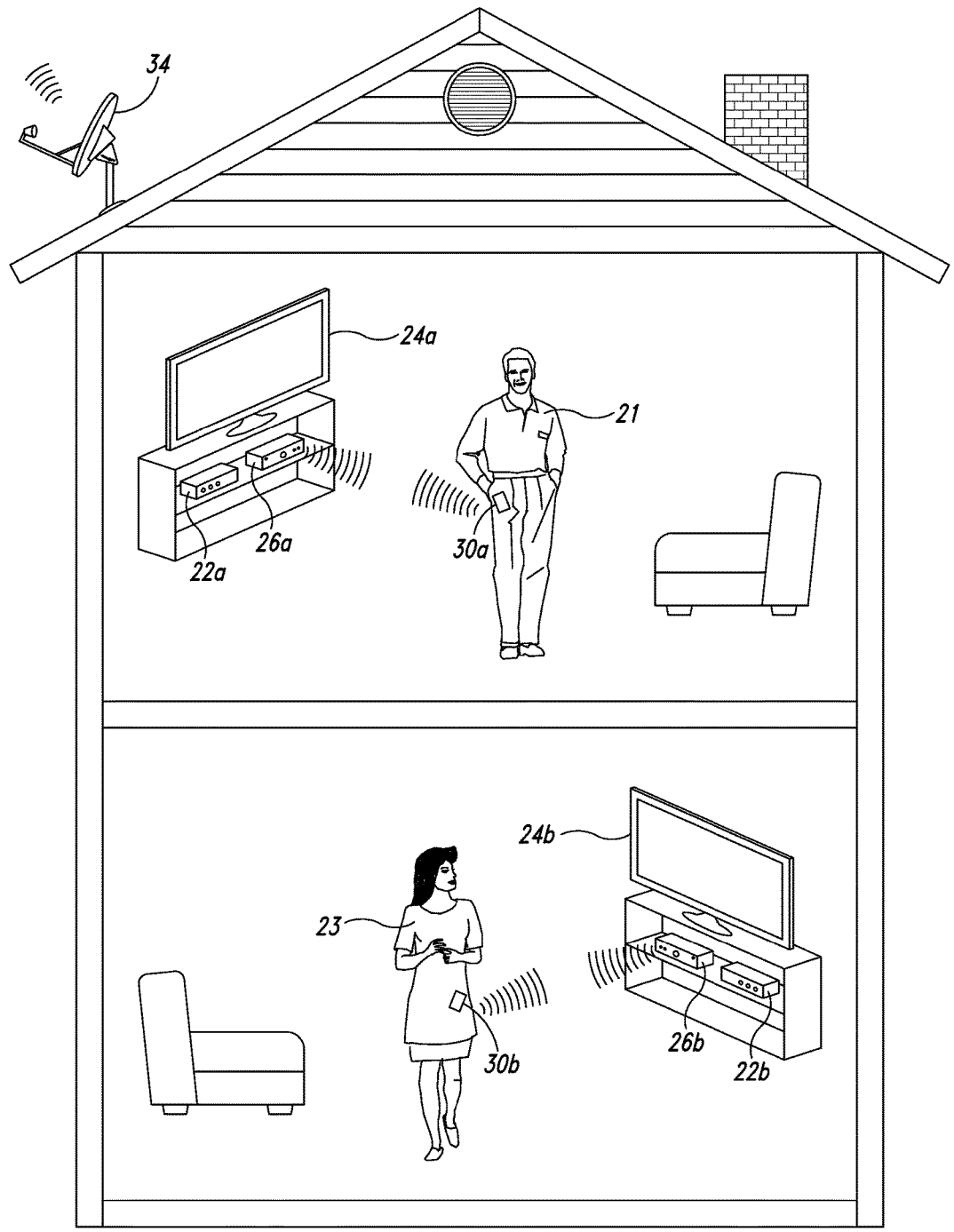
FIG. 2 illustrates a media content providing system according to one embodiment.

FIG. 2 illustrates a home entertainment system 20 including a set-top box 22a coupled to a television 24a and an electronic device 26a. A first user 21 having a portable electronic device 30a is in proximity to set-top box 22a. On a lower floor of the home a set-top box 22b is coupled to a television 24b and an electronic media device 26b. A second user 23 with a portable electronic device 30b is in proximity to the set-top box 22b.

Many home entertainment systems include multiple set-top boxes and televisions coupled to a satellite dish or cable television provide and receive content therefrom. It is common, in a home in which multiple set-top boxes are present, for a user to use a particular remote control to control one set-top box and a different remote control to control another set-top box. Sometimes a single remote control controls both set-top boxes. It can be very inconvenient to have to operate multiple remote controls and to stop programming in one set-top box to move to another room as circumstances may require and then to operate the second set-top box in an effort to resume programming the user was watching on the first set-top box.

The first user 21 of the home entertainment system 20 according to FIG. 2 can operate any of the set-top boxes 22a or 22b merely by being in the presence of the set-top box 22a or 22b accompanied by the portable electronic device 30a or 30b associated with that user. In one embodiment, both set-top boxes 22a and 22b recognize all of the same portable electronic devices 30a or 30b. The respective users associated with the portable electronic devices 30a and 30b can move about the house and operate the set-top boxes 22a and 22b by voice command or without any command at all just by walking into the room and having the relevant set-top box immediately display content according to that user's profile and the particular time and day of the week.

In one embodiment, if the user 21 associated with electronic device 30a is watching media content provided by the set-top box 22a on the television 24a and must leave the room as circumstances may require, the set-top box 22a detects that the user 21 is no longer in proximity and cease providing content and can shut down. Upon going downstairs into proximity with the set-top box 22b, set-top box 22b can detect the presence of the portable electronic device 30a and having received data from the set-top box 22a, set-top box 22b can immediately begin providing the media content that the user 21 was watching from to set-top box 22a. In one embodiment, when the set-top box 22a detects that the portable electronic device 30a is no longer in proximity, set-top box 22a can begin recording to a DVR or other memory the remainder of the program that was being watched. When the user 21 is in the proximity of the set-top box 22b, the set-top box 22b can immediately begin displaying the content at the point that was left off by the user 21 associated with the portable electronic device 30a. Alternatively, when the set-top box 22b detects the presence of the portable electronic device 30a, the set-top box 22b can provide an audio request asking if the user would like to resume content that was being displayed on the set-top box 22a. If the set-top box 22b detects the presence of both portable electronic devices 30a and 30b, the set-top box 22b can determine the priority of the portable electronic devices 30a and 30b and can begin displaying content or performing operations according to the profile of the portable electronic device having higher priority.

In one embodiment, both set-top boxes 22a and 22b store identical user profiles for each user 21 and 23. Thus, either set-top box 22a or 22b will perform the same operations when detecting the presence of the portable electronic device 30a or 30b, as the case may be. Alternatively, each set-top box can store different user preferences in the user profiles. For example, the set-top box 22b can display one type of content when the user 21 of the portable electronic device 30a is present, while the set-top box 22a can display a different kind of content when the user 23 of the portable electronic device 30b is present. This can be the case with every user profile associated with the portable electronic devices 22a and 22b. In one embodiment, the set-top box 22a or 22b can display a programming guide unique to each user profile associated with the portable electronic devices. Each user can specify a favorites list which can be displayed when the menu button is pressed on a remote control or which can be displayed automatically when the user's presence is detected or when the user gives a spoken command.

Figure 3:
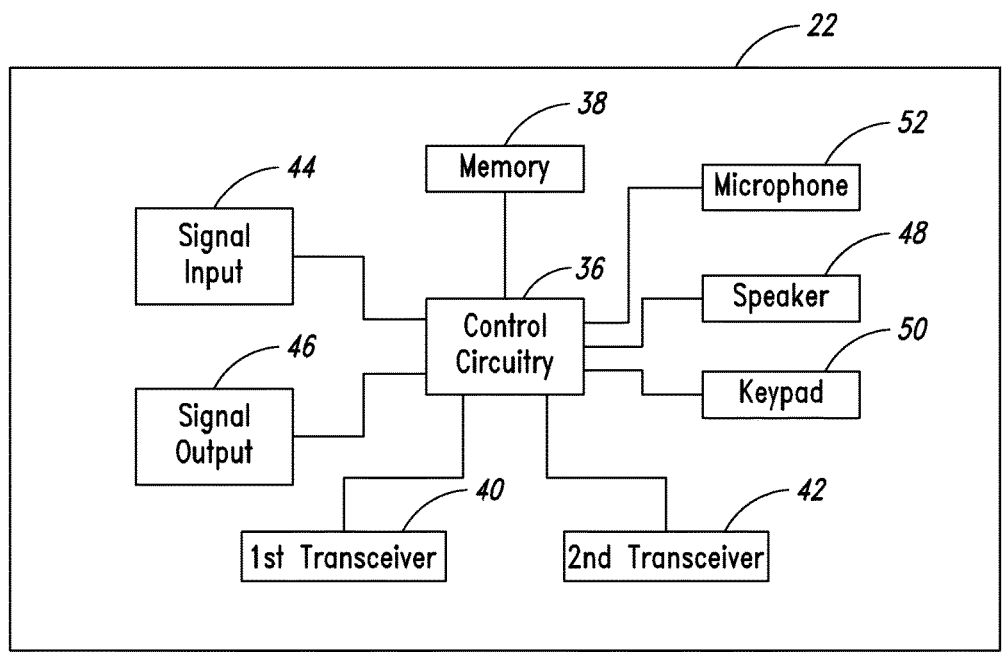
FIG. 3 is a block diagram of an electronic device according to one embodiment.

FIG. 3 is a block diagram of a set-top box 22 according to one embodiment. The set-top box 22 includes control circuitry 36 and a memory 38 coupled to the control circuitry 36. The set-top box further includes a first transceiver 40, a second transceiver 42, input ports 44, output ports 46, speaker 48, keypad 50, and microphone 52 all coupled to the control circuitry 36.

The control circuitry 36 can include one or more microprocessors, microcontrollers, video processing circuits, audio processing circuits, and any other suitable control circuitry.

The control circuitry 36 is configured to store in memory 38 the user profiles and user identification codes associated with each of the portable electronic devices 30 which are registered with the set-top box 22. The memory 38 can also store speech recognition software, allowing the set-top box 22 to recognize speech of the users. The memory 38 can store any relevant software or data for operation of the set-top box 22.

The first transceiver 40 is, for example, an infrared or radio frequency transceiver configured to interface with the remote control 32. The first transceiver 40 can send and receive control signals to and from the remote control 32. The first transceiver 40 can also be configured to send control commands and receive information from a television 24, an electronic media device 26, or an audio system 28. The control circuitry 36 controls the first transceiver 40. The control circuitry therefore causes the first transceiver 40 to transmit signals and also processes signals received by the first transceiver 40. Thus, if the first transceiver 40 receives a control signal from the remote control 32, the control circuitry 36 can process the signal and execute the command.

The second transceiver 42 is configured to interface with the portable electronic device 30, as described previously. The second transceiver 42 is thus configured to operate on a Bluetooth protocol or any other suitable protocol for communicating with the portable electronic device 30. The second transceiver 42 is controlled by the control circuitry 36 as well. The control circuitry 36 therefore can control the second receiver 42, causing it to transmit the interrogation signal periodically. When the second transceiver receives the identification signal from the portable electronic device 30, the identification signal is processed by the control circuitry 36. The control circuitry 36 can extract the identification code from the identification signal and can compare the identification code to identification codes associated with user profiles stored in the memory. The control circuitry 36 can therefore determine the identity of the portable electronic device 30 and can load the preferences associated with the profile of the user associated with the portable electronic device. Alternatively, the first transceiver 40 can communicate both with the remote control and the portable electronic device 30.

In one embodiment the input port 44 is coupled to the satellite dish 34. The satellite dish 34 therefore provides media content signals through the input port 44 to the control circuitry 36. As described previously, the control circuitry 36 can include video processing circuitry, audio processing circuitry, and any other kind of processing circuitry to process signals coming into the input port 44. The input port 44 can also receive signals from another set-top box or from other associated electronic devices 26.

The output port 46 can provide media content to television 24 or to another associated electronic device 26. The control circuitry 36 provides the output signals to the output port 46. The output port 46 can also supply signals to the audio system 28. The output port 46 can include an HDMI port, coaxial cable port, Ethernet port, or any other suitable output port.

The speaker 48 is also controlled by the control circuitry 36. When a portable electronic device 30 is detected by a set-top box 22, the control circuitry can manipulate the speaker 48 to output a request for audio commands to the user. Alternatively, these output commands can be output by the audio system 28, as described previously.

The keypad 50 can be used by the user to manually input commands to the set-top box 22. The keypad 50 can include a power button, channel up and channel down buttons, or any other suitable buttons. Keypad 50 can also contain buttons which allow for easy registration of the portable electronic device 30. For example, a button can be pressed on the keypad 50, which is a synchronization button. After pressing the synchronization button, the user can be prompted to place the portable electronic device 30 near the second transceiver 42 or the first transceiver 40. The user may also be prompted to provide some input to the portable electronic device 30 so that identification code can be exchanged with set-top box 22. The microphone 52 can receive input audio commands from the user. When input audio commands are detected by the control circuitry 36 through the microphone 52, the set-top box 22 can execute the audio commands and can change the configuration of the home entertainment system 20 according to the spoken commands received by the microphone 52.

Figure 4:
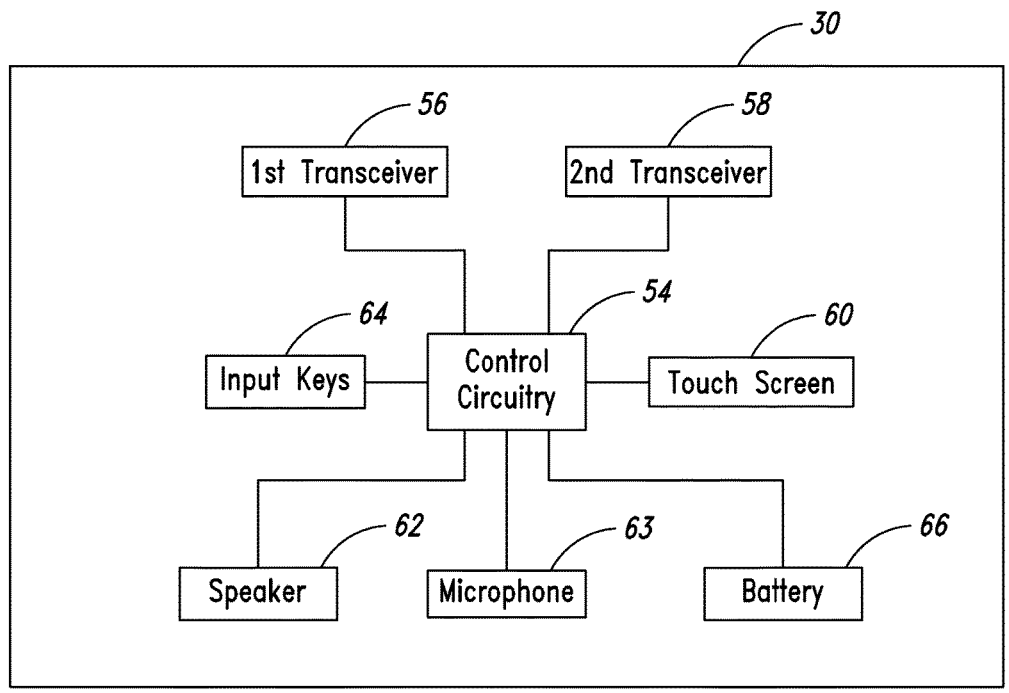
FIG. 4 is a block diagram of a mobile electronic device according to one embodiment.

FIG. 4 is a block diagram of a portable electronic device 30 according to one embodiment. The portable electronic device 30 is, for example, a mobile phone, a PDA, an MP3 player, a tablet, a computer, or any other suitable portable electronic device, as described previously. The portable electronic device 30 includes control circuitry 54 coupled to a first transceiver 56, a second transceiver 58, a touch screen 60, a speaker 62, a microphone 63, input keys 64, and a battery 66.

The first transceiver 56 is configured to receive the interrogation signal broadcast by the set-top box 22 and to broadcast the identification signal, including the identification code, in response to the interrogation signal. The control circuitry 54 is configured to control the first transceiver 56 to process signals received by the first transceiver and to cause the first transceiver 56 to broadcast other signals. The first transceiver 56 can include a Bluetooth compatible transceiver or any other suitable transceiver for communicating with the set-top box 22.

In one embodiment, the second transceiver 58 is a mobile phone transceiver configured to exchange signals with a mobile phone service provider. For example, the second transceiver 58 can interface with a cellular antenna, it can allow the user to send text messages over a cellular network, to hold a phone call over the cellular network, or to interface with a wireless internet network and to transmit and receive data over the wireless internet network. In one embodiment, only one transceiver is present and can perform all these functions.

In one embodiment, the mobile electronic device has a touch screen 60 which a user can manipulate to interface with the mobile electronic device 30. The touch screen 60 can display icons which a user can touch to activate various functions on the portable electronic device 30. The control circuitry 54 controls the touch screen, causing it to both display images and to detect user input. In one embodiment, the touch screen 60 can be utilized to cause the portable electronic device 30 to act as a remote control for the set-top box 22. In such an embodiment, not only does the set-top box 22 automatically display content after detecting the presence of the mobile electronic device 30, but the portable electronic device 30 can also act as a remote control in place of the remote control 32. Thus, the first transceiver 56 can send control signals to the set-top box 22 to cause the set-top box 22 to display certain media content or to manipulate the television 24, electronic media device 26, sound system 28, or other associated electronic devices of the home entertainment network 20. The portable electronic device 30 can also itself send control signals to the television 24, electronic media device 26, or the audio system 28. The touch screen 60 can display icons representing input keys for controlling the set-top box 22 or other devices of the home entertainment network 20. In one embodiment, the portable electronic device 30 can also be used to control the set-top box 22 when the user is not in the presence of the home entertainment network 20. For example, if the user is away from home, the user can operate the portable electronic device 30 to transmit signals over a cellular network or a wireless internet network to provide commands to a set-top box 22. Thus, the user of the portable electronic device 30 can command the set-top box 22 to record media content, to display media content, to turn off or to turn on the set-top box 22, to prevent users from using the set-top box 22, or any other suitable functions. As one alternative, the microphone 63 of the mobile phone that is the portable electric device 30 can be the microphone to receive voice commands. Namely, instead of having a microphone 52 on the set top box 22 receive the voice commands, the microphone 63 on the portable electronic device 30 receives the voice commands, processes them and uses them to control the system. Since all mobile phones have a microphone 63, this will be an easy, low cost solution and a microphone 52 on the set top box need not be provided.

The portable electronic device 30 also includes input keys 64, such as a power button or other buttons for changing the volume, selecting services, or any other suitable input commands for the portable electronic device 30. The battery 66 powers the portable electronic device 30.

Figure 5:
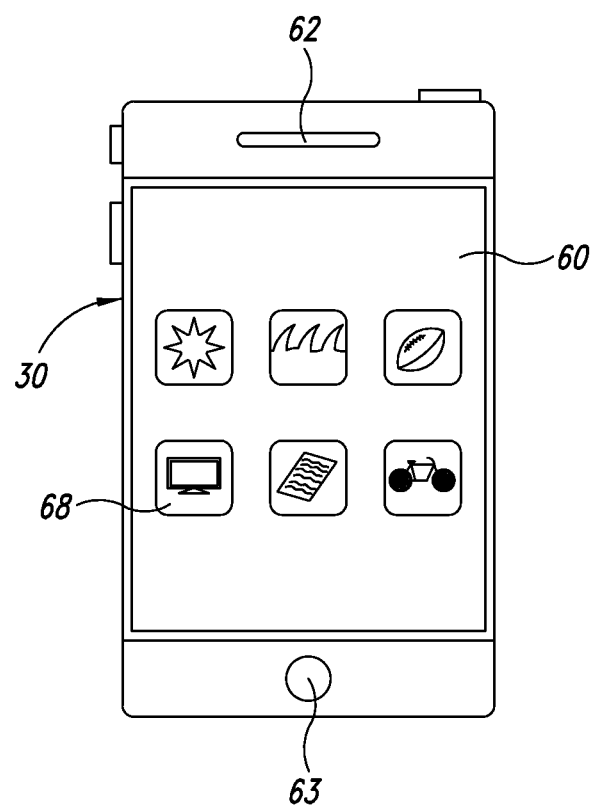
FIG. 5 illustrates a mobile electronic device according to one embodiment.

FIG. 5 is an illustration of a mobile phone that is the electronic device 30 according to one embodiment having a touch screen 60, speaker 62 and microphone 63. The mobile phone is configured to download applications from an application provider. In one embodiment, the mobile phone can download an application for interfacing with a set-top box 22. The touch screen 60 of the mobile phone displays icons representing the applications. The icon 68 represents the application which can control the set-top box 22. When the mobile phone has downloaded and installed the set-top box application 68, the mobile phone can register with the set-top box 22 so that the set-top box 22 can receive the identification code associated with the mobile phone and store the identification and create a new user profile associated with the identification code in the memory 38 of the set-top box 22. In one embodiment, the application 68 is configured to automatically respond to an interrogation signal received from the set-top box 22 by transmitting an identification signal. The identification signal transmitting from the mobile phone includes the identification code which allows the set-top box 22 to recognize the mobile phone and to load the user profile and perform operations associated with the identification code.

Additionally, when a user wishes to operate set-top box 22 or to remotely control the set-top box 22, the user can touch the icon 68 on the touch screen 60 representing the set-top box control application and can then use the phone as a remote control to control the set-top box 22 and other electronic devices associated with a home entertainment system 20. The user of the mobile phone may be in proximity with the set-top box 22 and thereby control the set-top box 22 through the same protocol that receives the interrogation signal from set-top box 22 and transmits the identification signal or through a different transceiver. When the user is operating the set-top box control application 68, the user can control the set-top box 22 even when not in the presence of the set-top box 22. For example, when the user is at work and the user would like the set-top box 22 to record a program, the user can operate the set-top box control application 68 and can thereby cause set-top box 22 to execute instructions. The portable electronic device 30 includes speaker 48 which can broadcast audio signals to the user and microphone 63 to receive commands when in the set top box application 68.

Figure 6:
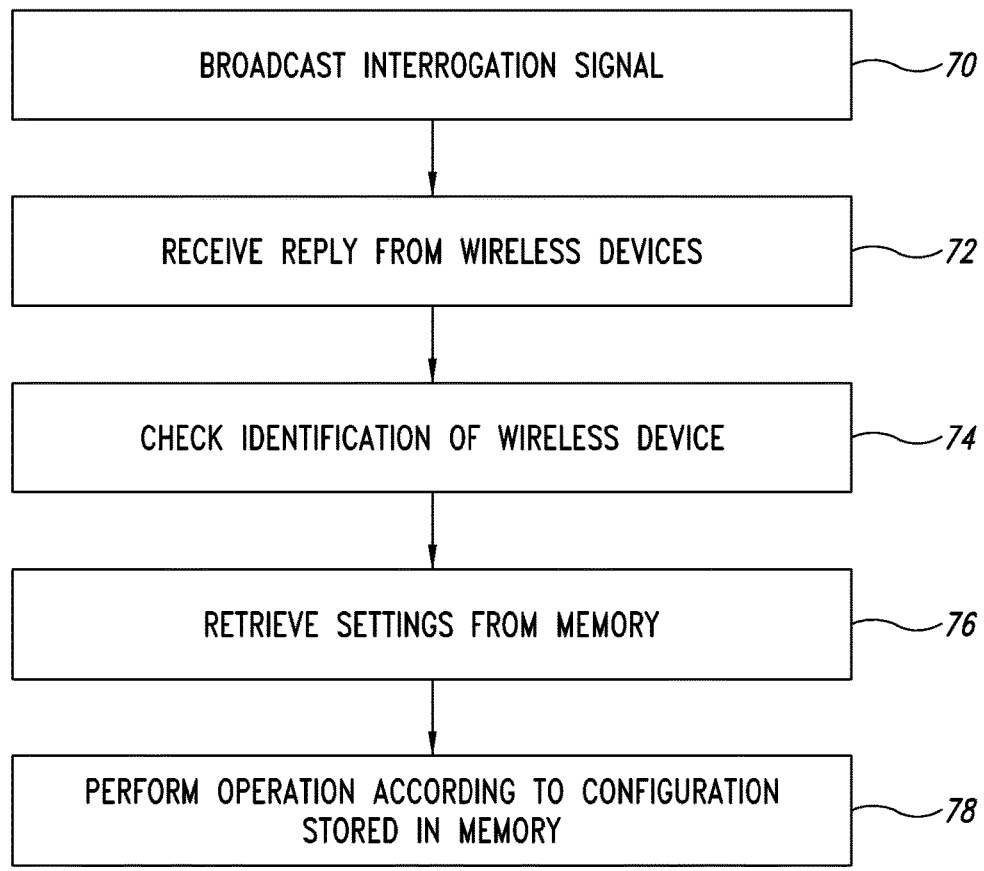
FIG. 6 illustrates a process for implementing a media content providing system according to one embodiment.

FIG. 6 is a flow diagram of a process for operating the set-top box 22 of a home entertainment system 20. At 70, the set-top box 22 broadcasts an interrogation signal. The set-top box 22 can be configured to broadcast the interrogation signal continuously or repeatedly at selected intervals. In one embodiment the set-top box 22 broadcasts an interrogation signal multiple times each second or once every few seconds. The interrogation signal is configured to cause an associated portable electronic device 30 to broadcast an identification signal in response to receiving the interrogation signal.

At 72, the set-top box 22 receives an identification signal from the portable electronic device 30 as a reply to the interrogation signal. The identification signal includes an identification code identifying the portable electronic device 30.

At 74, the set-top box 22 checks the identification code of the portable electronic device 30. The set-top box 22 compares the identification code to identification codes stored in the memory 38 of the set-top box 22. When the set-top box 22 finds a matching identification code in the memory 38 of the set-top box 22, the set-top box retrieves the user settings associated with that identification code from the memory 36 at step 76. Upon retrieving the user profile from the memory 38, the set-top box 22 performs an operation or set of operations according to the associated profile stored in the memory 38. As discussed previously, this operation can include outputting an audible request for instructions, turning on the television 24 and displaying selected content on the television 24, or other suitable operations. As an alternative, the set top box 22 can be a passive, listening device and when a portable electronic device 30 outputs a signal, it can detect this and respond with a query. Since many types of portable electronic devices 30 routinely output a ping signal or output a signal when being used for a phone call, the set-top box 22 can listen for such signals and then respond in place of broadcasting an interrogation signal.

Figure 7:
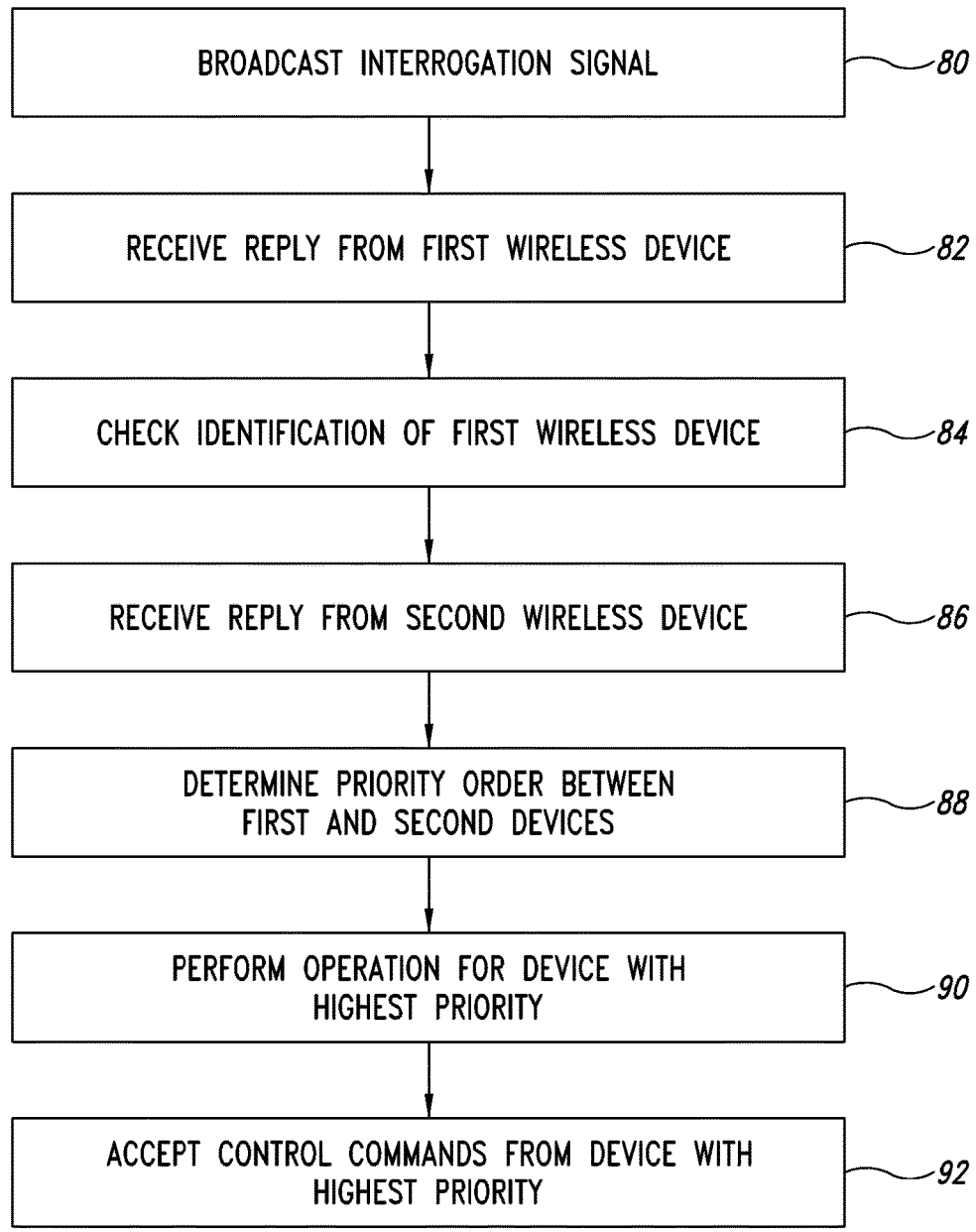
FIG. 7 illustrates a process for implementing a media content providing system according to an alternative embodiment.

FIG. 7 is a flowchart of a process for controlling a set-top box 22 according to one embodiment. At 80, the set-top box 22 broadcasts an interrogation signal as described previously or receives an input signal from a local portable electronic device 30. At 82, the set-top box 22 receives an identification signal from the portable electronic device 30 as described previously. The identification signal includes an identification code associated with the portable electronic device 30. At 84, the set-top box 22 compares the identification code received in the identification signal to identification codes stored in the memory 38 of the set-top box 22. The set-top box 22 identifies a user profile corresponding to the identification code received in the identification signal. At 86, the set-top box 22 receives a second portable electronic device. The set-top box 22 compares the identification code in the second identification signal to identification codes stored in the user profiles in the memory 38. The set-top box identifies that two portable electronic devices 30 are present and that a conflict has arisen. At 88, the set-top box 22 determines the priority between the first and second portable electronic devices. The user profiles associated with the first and second portable electronic devices 30 include priority data for the first and second portable electronic devices. The set-top box 22 can therefore determine the priority order between the first and second portable electronic devices. At 90, the set-top box 22 performs operations for the portable electronic device having the highest priority between the first and second portable electronic devices. At 92, the set-top box 22 accepts control commands from the portable electronic device 30 having the highest priority. These control commands can control the set-top box to change the channel to display a guide or to do any other suitable operations. The portable electronic device 30 with the highest priority is enabled to act as a remote control for the set-top box 22.

While the description makes specific reference to a set-top box 22, other types of television receivers can be used in place of a set-top box 22. For example, some televisions include television receiver hardware/software which performs the functions commonly performed by set-top boxes. Thus, a set-top box is only one example of a television receiver that can implement the functions described in the foregoing disclosure. Other types of television receivers which receive satellite, cable, internet, or broadcast television signals can also implement the functions of the set-top box 22 described herein. All such other television receivers fall within the scope of the present disclosure.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A set-top box comprising:
    a first transmitter configured to output an interrogation signal when the set-top box is in a low power mode;
    a first receiver configured to receive an identification signal transmitted from a mobile electronic device in response to the interrogation signal, the identification signal including an identification code;
    a memory configured to store a plurality of user profiles, each user profile including a respective registered identification code and a respective command; and
    control circuitry configured to compare the identification code to the registered identification codes stored in the memory, to exit the low power mode in response to receiving the identification signal, and to execute the command corresponding to a registered identification code that matches the identification code of the identification signal if fewer than a predetermined number of commands have been previously executed in a predetermined timeframe.

2. The set-top box of claim 1 comprising an input port coupled to the control circuitry and configured to receive media content from a media content provider.

3. The set-top box of claim 2 comprising an output port coupled to the control circuitry and configured to output the media content to be displayed on a display coupled to the output port.

4. The set-top box of claim 3 wherein the output port is configured to display media content selected according to the user profile corresponding to the identification code of the identification signal.

5. The set-top box of claim 1 wherein the control circuitry is further configured to receive user input that sets the predetermined number of commands.

6. The set-top box of claim 1 wherein the control circuitry is configured to further select a media content channel based on the user profile corresponding to the identification code of the identification signal and provide content from the selected media channel to a display device for display to a user in response to receipt of the identification signal.

7. The set-top box of claim 1 wherein the command includes an audible request for instructions from a user.

8. The set-top box of claim 1 wherein the control circuitry executes the command by being further configured to detect how close the mobile electronic device is to the set-top box and execute the command in response to the mobile electronic device being detected within a threshold distance from the set-top box.

9. The set-top box of claim 1 wherein the control circuitry executes the command by being further configured to turn on a display device electrically coupled to the set-top box upon receiving the identification signal.

10. A method comprising:
    storing a plurality of user profiles that each includes a respective registered identification code and a respective command;
    transmitting, by a content receiver, an interrogation signal when the content receiver is in a low power mode;
    receiving, at the content receiver, an identification signal having an identification code transmitted from a mobile electronic device in response to the interrogation signal;
    in response to receiving the identification signal, exiting the low power mode;
    comparing, by the content receiver, the received identification code to the respective registered identification codes in the plurality of user profiles; and
    in response to the received identification code matching a registered identification code for a user profile of the plurality of user profiles, executing, by the content receiver, the respective command from the user profile if fewer than a select number of commands have been previously executed by the content receiver in a predetermined timeframe.

11. The method of claim 10 further comprising:
    receiving user input that sets the select number of commands.

12. The method of claim 10 further comprising:
    selecting media content based on the user profile corresponding to the received identification code; and
    providing the selected media content to a display device for display to a user in response to receiving the identification signal.

13. The method of claim 10 wherein the respective command includes an audible request for instructions from a user.

14. The method of claim 10 wherein executing the respective command from the user profile includes:
    detecting how close the mobile electronic device is to the content receiver; and
    executing the respective command in response to the mobile electronic device being detected within a threshold distance from the content receiver.

15. The method of claim 10 wherein executing the respective command from the user profile includes:
    turning on a display device electrically coupled to the content receiver upon receiving the identification signal.

16. A system comprising:
    a television receiver, comprising:
        a transmitter that periodically transmits interrogation signals when the television receiver is in a low power mode;
        a receiver that receives identification signals transmitted from a portable electronic device;
        a memory configured to store a first user profile having a first command and a first user code and to store a second user profile having a second command and a second user code; and
        a processor that executes computer instructions to
            transmit, via the transmitter, an interrogation signal when the television receiver is in a low power mode;
            receive, via the receiver, an identification signal having an identification code transmitted from the portable electronic device in response to receipt of the interrogation signal;
            in response to receipt of the identification signal, exit the low power mode;
            compare the identification code to the first user code and the second user code stored in the memory; and
            in response to the identification code matching the first user code, execute the first command if fewer than a select number of commands have been previously executed by the television receiver in a select timeframe.

* * * * *